April 4, 1967 J. H. WESSELS 3,312,782
VIDEO RECORDER UTILIZING A SYNCHRONIZED OSCILLATOR
FOR DEMODULATING A FREQUENCY-MODULATED CARRIER
Filed Sept. 13, 1963

INVENTOR.
JOHANNES H. WESSELS.
BY
Frank R. Trifari
AGENT

United States Patent Office 3,312,782

Patented Apr. 4, 1967

3,312,782

VIDEO RECORDER UTILIZING A SYNCHRONIZED OSCILLATOR FOR DEMODULATING A FREQUENCY-MODULATED CARRIER

Johannes Hendrik Wessels, Emmasingel, Eindhoven, Netherlands, assignor to North American Philips Company, Inc., New York, N.Y., a corporation of Delaware Filed Sept. 13, 1963, Ser. No. 308,806
Claims priority, application Netherlands, Oct. 24, 1962, 284,679
8 Claims. (Cl. 178—6.6)

This invention relates to a device for demodulating a frequency-modulated carrier; in particular, it relates to such a device comprising an oscillator synchronized by the frequency-modulated carrier and a frequency discriminator to which the output oscillations from the oscillator are applied.

Such demodulators afford the advantage, among others, that the action of the oscillator greatly suppresses amplitude modulation. They also have the property that, if the amplitude of the frequency-modulated carrier becomes too small for whatever reason, or if the frequency-modulated carrier even drops out completely, the oscillator starts to oscillate at its natural frequency. By choosing a suitable value for this natural frequency it is possible to obtain at the output of the frequency discriminator a direct-current signal having a suitable level which is determined by the prevailing conditions.

The demodulators may be advantageously used for demodulating the frequency-modulated carrier which occurs in some systems for recording and reproducing magnetic recordings relating to television images. In the said systems a signal consisting of a carrier wave modulated in frequency with a video-signal is recorded on a magnetic record carrier by means of one or more magnetic transducers, the upper side-band of the carrier wave usually being suppressed. The reproducing process likewise takes place with the aid of one or more magnetic transducers and some means must be employed for demodulating the frequency-modulated carrier when the record is reproduced.

If dirt collects between the transducers and the tape during recording or during reproducing, or if the tape becomes damaged, gaps will tend to occur in the signal being read from the tape. These gaps cause interference in the reproduced image, the interference generally being in the form of stripes which are either white or black as a function of the system employed.

When using a demodulator of the above-mentioned kind, however, it is possible by suitable choice of the natural frequency of the oscillator, to set up a direct-current signal at the output of the frequency discriminator during the occurrence of the gaps, which signal is reproduced as grey in the reproduced image; grey makes a less striking and hence less unpleasant impression than white or black.

A primary object of the invention is to provide a demodulating device as above-mentioned, which can supply an output signal which is matched to the signal information of the carrier wave when very low values of the frequency-modulated carrier wave are supplied to the demodulating device and also when there are gaps in the carrier wave. According to one aspect of the invention and in furtherance of the above object, the natural frequency of the oscillator is adjustable by means of a control signal which can be varied as a function of the signal information of the frequency-modulated carrier wave.

The invention is based in part upon recognition of the fact that, when the natural frequency of the oscillator follows substantially the frequency variations of the frequency-modulated carrier wave, then the oscillator will remain in synchronization much longer in the event of a great decrease in the amplitude of the frequency-modulated carrier wave supplied; in addition the output signal of the oscillator will retain substantially the correct frequency if the carrier wave falls out completely.

In order that the invention may be readily carried into effect, it will now be described in detail, by way of example, with reference to the accompanying diagrammatic drawing, in which.

Figures 1, 2, 3, 4, 5, 6:
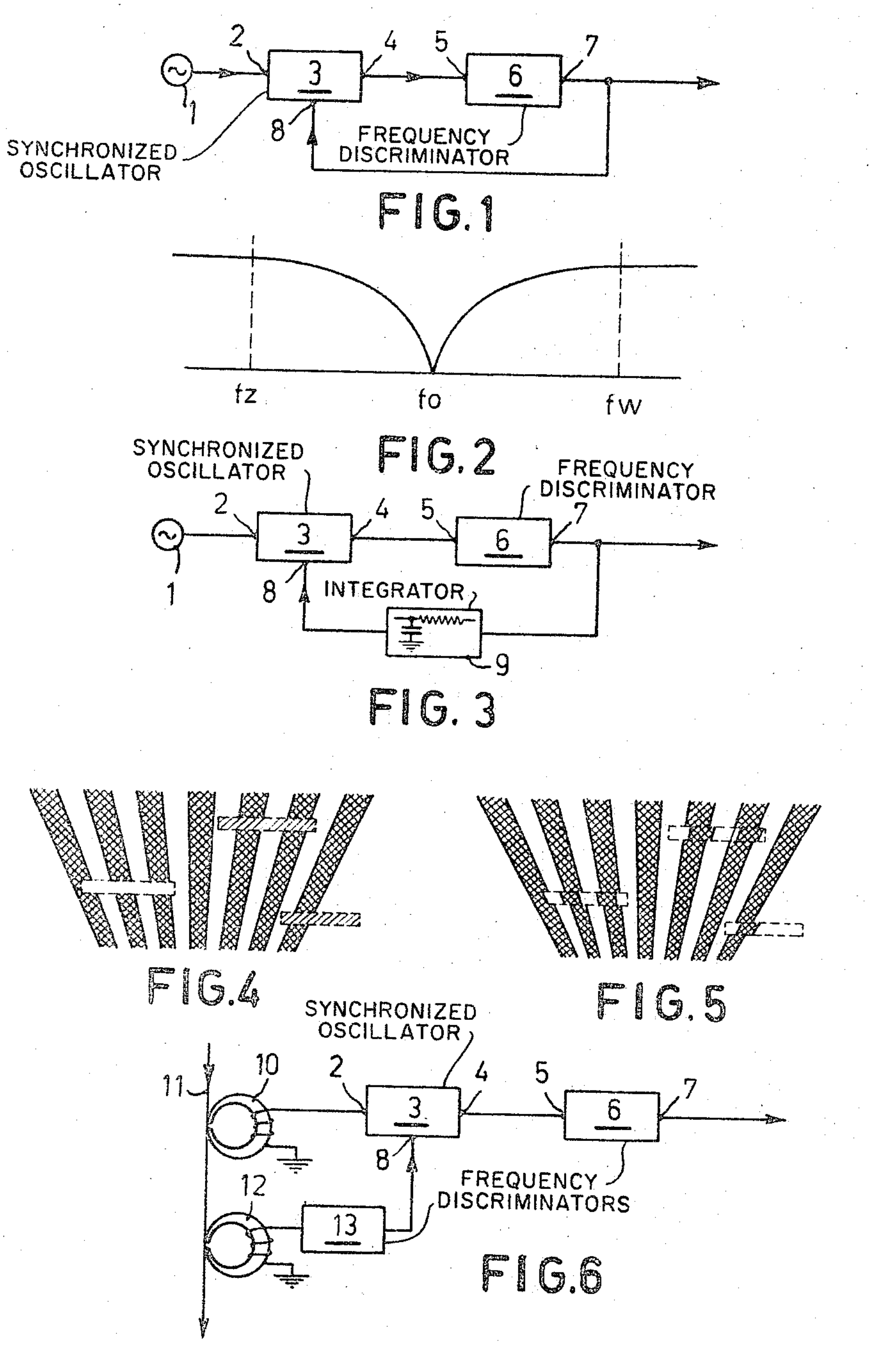
FIGURE 1 is a block diagram of one embodiment of a demodulating device according to the invention.
FIGURE 2 is a graphical illustration for explaining the various demodulating devices of the invention.
FIGURE 3 is a block diagram of another embodiment of the invention.
FIGURES 4 and 5 show the results of using the invention as illustrated on a portion of a reproduced television image.
FIGURE 6 shows an additional embodiment of the demodulating device.

Referring now to FIGURE 1, reference numeral 1 designates a signal source which delivers a frequency-modulated carrier wave. If the arrangement is one for demodulation of the frequency-modulated carrier wave recorder on a magnetic record carrier, the signal source 1 comprises a magnetic head along which the magnetic record carrier passes; the signal source may also comprise, for example, one or more amplifying and/or mixing stages.

The frequency-modulated carrier wave originating from the signal source 1 is supplied to an input 2 of an oscillator 3, which oscillator is synchronized by said carrier wave. As long as a signal of sufficient amplitude is delivered by the signal source 1, the signal appearing at the output 4 of the oscillator will have the same frequency as the instantanous frequency of the frequency-modulated carrier wave supplied. The output signal is applied to the input 5 of a frequency discriminator 6, the demodulated signal being available at the output 7 of this discriminator.

The oscillator 3 is preferably designed so that the amplitude of the output signal is substantially independent of the amplitude of the input signal. It is thus ensured that ampltiude modulations which result from interference or which occur if the signal source delivers a single sideband-modulator signal are limited in the oscillator itself. If the limiting action of the oscillator is still insufficient, it is possible either to arrange a separate limiter in the input channel or in the output channel of the oscillator, or to use a discriminator having a satisfactory limiting action.

FIGURE 2 shows, as a function of frequency, the minimum amplitude of the synchronizing FM signal applied to the input 2 which is necessary for correct synchronization of the oscillator. From this diagram it can be seen that, in order to synchronize the oscillator at a frequency which lies near the natural frequency $f_0$, a synchronizing signal having only a very small amplitude is necessary, whereas for synchronization at a frequency located further from the natural frequency, signals of greater amplitude must be applied to the input 2.

By way of example it is assumed that the frequency-modulated signal originating from the signal source 1 relates to television images and that the natural frequency $f_0$ of the oscillator is fixedly adjusted to a value which yields grey in the reproduced image. In FIGURE 2 the frequency corresponding to the white portions of the reproduced image is indicated by $f_W$ and the frequency yielding the black portions is indicated by $f_z$.

If, for example, during reproduction of white portion in the image, the amplitude of the FM signal delivered by the source 1 decreases to a value below the minimum value required for synchronization, the oscillator will go out of synchronization and start to oscillate at its natural frequency $f_0$. In this case a grey strip suddenly occurs in the white area of the reproduced image. Similarly, grey stripes may occur in the dark portions of the image to be reproduced due to a decrease in amplitude of the synchronizing signal.

According to the invention, in order to prevent such interference, the oscillator 3 is chosen of a type in which the natural frequency can be varied by means of a control signal which is applied to the oscillator. Such oscillators are known per se. According to the invention, the control signal is varied as a function of the signal information of the frequency-modulated carrier wave. In the embodiment shown in FIGURE 1, the control signal supplied to the input 8 of the oscillator is derived from the output 7 of the frequency discriminator.

The natural frequency of the oscillator is varied by the control signal so that the difference between the synchronization frequency and the natural frequency of the oscillator is always as small as possible. It is thus ensured that the frequency modulated signal required for synchronization usually has a very small amplitude so that the oscillator goes out of synchronization due to amplitude variations of that signal much less frequently than is the case with an oscillator having a natural frequency which is permanently fixed.

The invention also affords the advantage that, if the oscillator goes out of synchronization due to a momentary complete fall out of the FM signal, the oscillator will still keep oscillating at the same frequency. The interfering influence of gaps in the FM signal is thus completely compensated by the controlled oscillator, at least during the reproduction of large areas of equal luminance in the television image.

It is to be noted that, in the arrangement shown in FIGURE 1, it is necessary for the signal level originating from the discriminator and the level required for control of the natural frequency of the oscillator to be accurately matched to one another. If, for example, the discriminator delivers a signal having an amplitude a little greater than that required for control of the oscillator, the frequency of the oscillator will progressively increase in the absence of the synchronizing signal; on the other hand, the frequency of the oscillator will progressively decrease if the discriminator delivers a control signal which is a little too small. The circuit of FIG. 3 mitigates this situation. In FIG. 3 an integrating network 9 is included between the output 7 of the discriminator and the input 8 of the oscillator. The integrating network may be constituted, for example, by a simple RC-filter. In practice it appears that the time constant of the said integrating network is of the order of magnitude of $1/\mu$sec. in conventional systems for reading signals relating to television images which have been recorded on a magnetic record carrier. The inclusion of the integrating network ensures that the control signal to be applied to the oscillator is not determined by the frequency delivered at the same time by the oscillator, as is the case in the arrangement of FIGURE 1, but is determined by the mean-value of the frequencies delivered by the oscillator during a short period before. Gaps occurring in the frequency-modulated signal during the reproduction of a white area in the image are thus reproduced in white and gaps occurring during the reproduction of a black area are reproduced in black. Gaps in the FM signal, as shown in FIGURE 4, are reproduced as grey in portions of the image which are preceded by alternately white and black portions.

Considering the fact that the use of an oscillating limiter having a constant natural frequency is desirable for reasons mentioned above, the extension of the arrangement with an integrating network as shown in FIGURE 3 offers a very simple and economical solution for obtaining satisfactory compensation during gaps in the synchronizing frequency-modulated carrier wave. A still better but more expensive solution is one wherein the integrating network of FIGURE 3 is replaced by a phase-linear retarding network which provides a retardation of, for example, one line period. The frequency of the signal delivered by the oscillator during a gap is in this case determined by the signal information present in the frequency-modulated carrier wave one line period before. Thus, during a gap in the synchronizing carrier wave, the preceding line is read again. FIGURE 5 shows the result of a compensation carried out in this manner during alternately white and black portions of the reproduced image. Faults in compensation occur only if a gap coincides with a line portion which is not identical with the corresponding portion of the preceding line.

A still better compensation is obtained if the control signal is given a phase-linear retardation equal to, for example, a whole frame period. In this case faults in compensation occur only very rarely, since two sequential images are usually almost completely identical.

If the invention is applied to an arrangement for reproducing signals recorded on a magnetic record carrier, an alternative solution for a phase-linear retardation is possible. An embodiment thereof is shown by the block diagram of FIGURE 6.

In this figure the reference numeral 10 indicates a magnetic head along which a magnetic record carrier 11 passes in the direction indicated by the arrow. The recording on the record carrier comprises the frequency-modulated carrier wave which is read by the head 10 and then applied as a synchronizing signal to the input 2 of the oscillator 3. The magnetic record carrier 11 also passes along a second magnetic head 12 which thus reads the same frequency-modulated carrier wave as the head 10, but with a phase-linear retardation which depends on the spacing between the two heads and the speed of the magnetic record carrier relative to the heads. The frequency-modulated carrier wave produced in the head 12 is modulated in a frequency-discriminator 13 whose output signal is applied as a control signal to the input 8 of the oscillator 3. Any desired retardation can be obtained by adjusting the spacing between the heads 10 and 12; for example the retardation may be a frame period, a line period, or a raster period plus or minus a half line period. If the head 12 is placed upstream of the head 10, the information of an image occurring later can be used for forming the control signal.

According to a further aspect of the invention, the oscillator employed may be of the multivibrator type comprising two amplifiers whose input and output electrodes are coupled crosswise through capacitors, the control signal being applied to the input electrodes through two rectifiers connected to the capacitors and alternately made conducting by the multivibrator voltage; the source preferably should have a high internal impedance. Such an oscillator is described in copending application Serial No. 256,383, filed February 5, 1963, and assigned to the assignee of the instant application. This type of said oscillator has the advantage that the natural frequency is a linear function of the control signal; furthermore it is possible for the oscillating frequency of such an oscillator to be varied very rapidly; which is important especially if the frequency-modulated signals relate to television images. The conventional adjustable oscillators such as, for example, those comprising an LC-circuit and a reactance tube have the disadvantage that a sudden variation in resonance frequency involves undesirable transition phenomena.

While the invention has been described with respect to specific embodiments, various changes and modifications thereof will be readily apparent to those skilled in the art without departing from the inventive concept, the scope of which is set forth in the appended claims.

What is claimed is:

1. Apparatus for demodulating a frequency-modulated carrier wave, comprising: an oscillator adapted to be synchronized by said frequency-modulated carrier wave, means for deriving a control signal varying as a function of the signal information of said frequency-modulated carrier wave, and means for applying said control signal to said oscillator for varying the natural frequency of said oscillator.

2. Apparatus for demodulating a frequency-modulated carrier wave, comprising: an oscillator adapted to be synchronized by said frequency-modulated carrier wave, means for deriving a control signal varying as a function of the signal information of said frequency-modulated carrier wave, means for time-displacing said control signal, and means for applying said time-displaced control signal to said oscillator for varying the natural frequency of said oscillator.

3. Apparatus as recited in claim 2 wherein said time-displacing means comprises an integrating network.

4. Apparatus for demodulating a carrier wave which is frequency-modulated with television image information, comprising: an oscillator adapted to be synchronized by said frequency-modulated carrier wave, means for deriving a control signal varying as a function of the image information of said frequency-modulated carrier wave, means for applying said control signal to an integrating network having a time constant of substantially 1 $\mu$sec. and means for applying the output of said integrating network to said oscillator for varying the natural frequency of said oscillator.

5. Apparatus for demodulating a carrier wave which is frequency-modulated with television image information, comprising: an oscillator adapted to be synchronized by said frequency-modulated carrier wave, means for deriving a control signal varying as a function of the image information of said frequency-modulated carrier wave, means for time-displacing said control signal by at least one line period of said image information, and means for applying said time-displaced control signal to said oscillator for varying the natural frequency of said oscillator.

6. Apparatus for demodulating a carrier wave which is frequency-modulated with television image information, comprising: an oscillator adapted to be synchronized by said frequency-modulated carrier wave, means for deriving a control signal varying as a function of the image information of said frequency-modulated carrier wave, means for time-displacing said control signal by at least one frame period of said image information, and means for applying said time-displaced control signal to said oscillator for varying the natural frequency of said oscillator.

7. Apparatus for demodulating a carrier wave which is frequency-modulated with television image information, comprising: an oscillator adapted to be synchronized by said frequency-modulated carrier wave, means for deriving a control signal varying as a function of the image information of said frequency-modulated carrier wave, means for time-displacing said control signal by at least once a raster period plus or minus a half line period and means for applying said time-displaced control signal to said oscillator for varying the natural frequency of said oscillator.

8. Apparatus for demodulating a frequency-modulated carrier wave, comprising: a magnetic record device on which a frequency-modulated record carrier wave is recorded, first reproducing means magnetically co-acting with said record device for reproducing said frequency-modulated carrier wave, an oscillator adapted to be synchronized by the reproduced frequency-modulated carrier wave, second reproducing means co-acting with said record device, said second reproducing means being displaced from said first reproducing means, means for deriving a control signal from said second reproducing means varying as a function of the signal information of said frequency-modulated carrier wave, and means for applying said control signal to said oscillator for varying the natural frequency of said oscillator.

References Cited by the Examiner

UNITED STATES PATENTS

| | | | |
|---|---|---|---|
| 2,373,546 | 4/1945 | Crosby | 325—349 |
| 2,513,763 | 7/1950 | Vilkomerson | 329—123 |

DAVID G. REDINBAUGH, *Primary Examiner.*

H. W. BRITTON, *Assistant Examiner.*